US011981556B2

(12) United States Patent
Kaplan et al.

(10) Patent No.: US 11,981,556 B2
(45) Date of Patent: May 14, 2024

(54) COOLED BEVERAGE DISPENSING SYSTEMS AND ASSOCIATED DEVICES

(71) Applicant: Taphandles LLC, Seattle, WA (US)

(72) Inventors: David Kaplan, Seattle, WA (US); David Zhang, Bothell, WA (US); Marcus Alan Latham, Seattle, WA (US); Robert Miles Blackmore, Seattle, WA (US)

(73) Assignee: TAPHANDLES LLC, Seattle, WA (US)

( * ) Notice: Subject to any disclaimer, the term of this patent is extended or adjusted under 35 U.S.C. 154(b) by 415 days.

(21) Appl. No.: 17/318,932

(22) Filed: May 12, 2021

(65) Prior Publication Data

US 2021/0261399 A1 Aug. 26, 2021

Related U.S. Application Data

(62) Division of application No. 16/276,465, filed on Feb. 14, 2019, now Pat. No. 11,034,569.

(Continued)

(51) Int. Cl.

| | |
|---|---|
| ***B67D 1/08*** | (2006.01) |
| ***B67D 1/00*** | (2006.01) |
| ***B67D 1/12*** | (2006.01) |

(52) U.S. Cl.

CPC ......... *B67D 1/0884* (2013.01); *B67D 1/0081* (2013.01); *B67D 1/0867* (2013.01); (Continued)

(58) Field of Classification Search

CPC .. B67D 1/0884; B67D 1/0867; B67D 1/0868; B67D 1/1245; B67D 1/0081; B67D 2210/0089; B67D 1/0869; B67D 1/1405

See application file for complete search history.

(56) References Cited

U.S. PATENT DOCUMENTS

| | | | |
|---|---|---|---|
| 1,923,585 | A | 8/1933 | Reeves |
| 2,175,669 | A | 10/1939 | Rice |

(Continued)

FOREIGN PATENT DOCUMENTS

| | | | |
|---|---|---|---|
| AU | 2008226514 | B2 | 5/2014 |
| AU | 2010311401 | B2 | 5/2015 |

(Continued)

OTHER PUBLICATIONS

Smart Draft—Micro Matic, "Smart Draft Always Fresh." Instructional video, Smart Draft beer dispensing unit, 2:15 min., Dec. 9, 2010.

*Primary Examiner* — Kun Kai Ma

(74) *Attorney, Agent, or Firm* — Perkins Coie LLP

(57) ABSTRACT

Systems and devices for cooling and dispensing a beverage fluid are disclosed herein. One beverage dispensing system includes a beverage tower comprising a tower body, a shank, and a faucet. In some implementations, a coolant line is routed proximal to a beverage supply line through the tower body, through the shank, and into the faucet. In these and other implementations, the faucet includes a removable nozzle having a supplemental portion of the coolant line. In these and still other implementations, the faucet include a removable nozzle having a second coolant line. The coolant line and the second coolant line are configured to transport a coolant medium proximal to a beverage fluid in the beverage supply line to maintain or adjust the temperature of the beverage fluid. Many other features are described herein.

16 Claims, 9 Drawing Sheets

Related U.S. Application Data

(60) Provisional application No. 62/630,791, filed on Feb. 14, 2018.

(52) U.S. Cl.
CPC ......... *B67D 1/0868* (2013.01); *B67D 1/0888* (2013.01); *B67D 1/1245* (2013.01); *B67D 2001/0089* (2013.01); *B67D 2210/00104* (2013.01)

(56) References Cited

U.S. PATENT DOCUMENTS

| | | | |
|---|---|---|---|
| 2,871,675 | A | 2/1959 | Cornelius |
| 3,317,084 | A | 5/1967 | Welty |
| 3,599,839 | A | 8/1971 | Hansen |
| 5,617,736 | A | 4/1997 | Ito |
| 5,743,107 | A | 4/1998 | Kyees |
| 5,873,259 | A | 2/1999 | Spillman |
| 5,992,685 | A | 11/1999 | Credle, Jr. |
| 6,059,145 | A | 5/2000 | Stratton et al. |
| 6,182,555 | B1 | 2/2001 | Scheer et al. |
| 6,324,850 | B1 | 12/2001 | Davis |
| 6,446,458 | B1 | 9/2002 | Klepach |
| 6,502,724 | B1 | 1/2003 | Kelpach |
| 6,761,036 | B2 | 7/2004 | Teague et al. |
| 6,832,487 | B1 | 12/2004 | Baker |
| 7,032,781 | B2 | 4/2006 | Van Der Klaauw et al. |
| 7,140,514 | B2 | 11/2006 | Van Der Klaauw et al. |
| 7,188,751 | B2 | 3/2007 | Van Der Klaauw et al. |
| 7,305,847 | B2 | 12/2007 | Wolski et al. |
| 7,363,962 | B2 | 4/2008 | Cleland |
| 7,373,784 | B2 | 5/2008 | Haskayne |
| 7,389,647 | B1 | 6/2008 | Abraham, III |
| 7,628,023 | B2 | 12/2009 | Lucas |
| 7,661,556 | B2 | 2/2010 | Van Der Klaauw et al. |
| 7,743,624 | B2 | 6/2010 | Schneller et al. |
| 7,762,431 | B1 | 7/2010 | Tuyls et al. |
| 7,802,445 | B2 | 9/2010 | Winters |
| 7,975,881 | B1 | 7/2011 | Glucksman et al. |
| 8,387,828 | B2 | 3/2013 | Moothart |
| 8,464,903 | B2 | 6/2013 | Baker |
| 8,490,836 | B2 | 7/2013 | Rasmussen |
| 8,567,642 | B2 | 10/2013 | Hoover |
| 8,584,897 | B2 | 11/2013 | Belcham |
| 8,616,020 | B1 | 12/2013 | Abraham, III |
| 8,678,247 | B2 | 3/2014 | Haskayne et al. |
| 8,695,372 | B1 | 4/2014 | Dyal |
| 8,757,445 | B2 | 6/2014 | Robinson |
| 8,778,432 | B2 | 7/2014 | Lown |
| 9,127,881 | B2 | 9/2015 | Anderson et al. |
| 9,174,833 | B2 | 11/2015 | Yang et al. |
| 9,222,714 | B2 | 12/2015 | Zebuhr et al. |
| 9,249,006 | B2 | 2/2016 | Tobler |
| 9,302,898 | B2 | 4/2016 | Robinson |
| 9,346,659 | B2 | 5/2016 | Brown |
| 9,416,340 | B2 | 8/2016 | Kyle |
| 9,776,848 | B2 | 10/2017 | Metropulos et al. |
| 10,059,580 | B2 | 8/2018 | Wyatt et al. |
| 10,182,587 | B2 | 1/2019 | Lundberg et al. |
| 2004/0069368 | A1 | 4/2004 | Van Der K. et al. |
| 2005/0097913 | A1 | 5/2005 | Hess |
| 2006/0059940 | A1 | 3/2006 | Hess |
| 2010/0181341 | A1* | 7/2010 | Robinson ............. B67D 1/0862 222/146.6 |
| 2010/0187258 | A1 | 7/2010 | Santy |
| 2013/0200105 | A1 | 8/2013 | Robinson |
| 2014/0217126 | A1 | 8/2014 | Peirsman et al. |
| 2014/0246459 | A1* | 9/2014 | Robinson ............. B67D 1/0867 29/527.5 |
| 2015/0191685 | A1 | 7/2015 | Kyle |
| 2015/0230641 | A1 | 8/2015 | Reckley |
| 2015/0354886 | A1 | 12/2015 | Sinko |
| 2016/0039655 | A1 | 2/2016 | Takei |
| 2016/0061515 | A1 | 3/2016 | Wiemer et al. |
| 2016/0325979 | A1 | 11/2016 | Cook et al. |
| 2016/0347598 | A1 | 12/2016 | Gannon et al. |
| 2017/0081163 | A1 | 3/2017 | Gatipon et al. |
| 2017/0101301 | A1 | 4/2017 | Volin |
| 2017/0203264 | A1 | 7/2017 | Bona et al. |
| 2017/0233237 | A1* | 8/2017 | Donabauer .......... B67D 1/0004 222/146.6 |
| 2017/0233238 | A1 | 8/2017 | Bryant et al. |
| 2017/0292781 | A1 | 10/2017 | Pandeya et al. |
| 2017/0305731 | A1 | 10/2017 | Kyle |
| 2018/0155176 | A1 | 6/2018 | Cook |

FOREIGN PATENT DOCUMENTS

| | | | |
|---|---|---|---|
| AU | 2012233151 | B2 | 5/2016 |
| BR | 102014018460 | A2 | 5/2016 |
| BR | 112017003459 | A2 | 12/2017 |
| CA | 2920953 | A1 | 5/2014 |
| CA | 2887837 | A1 | 10/2015 |
| CA | 2829016 | C | 2/2016 |
| CN | 202101510 | U | 1/2012 |
| CN | 202101511 | U | 1/2012 |
| CN | 101146737 | B | 6/2012 |
| CN | 203881042 | U | 10/2014 |
| CN | 102666362 | B | 3/2015 |
| CN | 104477838 | A | 4/2015 |
| CN | 102036904 | B | 8/2015 |
| CN | 106103335 | A | 11/2016 |
| CN | 106247756 | A | 12/2016 |
| CN | 106322916 | A | 1/2017 |
| CN | 106440653 | A | 2/2017 |
| CN | 206073561 | U | 4/2017 |
| DE | 202005019217 | | 5/2007 |
| EP | 0919519 | A1 | 6/1999 |
| EP | 1284918 | | 2/2003 |
| EP | 1200336 | B1 | 11/2006 |
| EP | 1786721 | B1 | 12/2007 |
| EP | 1939558 | A1 | 7/2008 |
| EP | 1971903 | A2 | 9/2008 |
| EP | 1441975 | B1 | 4/2011 |
| EP | 1943182 | B1 | 4/2011 |
| EP | 1127027 | B1 | 5/2013 |
| EP | 2504269 | B1 | 6/2014 |
| EP | 2808678 | A2 | 12/2014 |
| EP | 2644562 | B1 | 3/2015 |
| EP | 2989046 | A1 | 3/2016 |
| EP | 3044158 | A1 | 7/2016 |
| EP | 2691312 | B1 | 5/2017 |
| EP | 3176127 | A1 | 6/2017 |
| EP | 2822891 | B1 | 7/2017 |
| EP | 3186188 | A1 | 7/2017 |
| EP | 2259994 | B1 | 9/2017 |
| EP | 3016903 | B1 | 12/2017 |
| EP | 2231505 | B1 | 2/2018 |
| ES | 2277927 | T3 | 8/2007 |
| ES | 2313239 | T3 | 3/2009 |
| FR | 2991676 | B3 | 6/2015 |
| GB | 2417063 | B | 5/2007 |
| GB | 2417065 | B | 7/2007 |
| GB | 2426753 | B | 12/2007 |
| GB | 2419352 | B | 1/2008 |
| GB | 2435089 | B | 3/2008 |
| GB | 2408091 | B | 8/2008 |
| GB | 2443332 | B | 1/2009 |
| GB | 2446312 | B | 2/2009 |
| GB | 2458713 | B | 10/2013 |
| GB | 2511851 | A | 9/2014 |
| GB | 2470660 | B | 9/2015 |
| HR | P20000121 | B1 | 3/2009 |
| IE | 20020640 | A1 | 3/2003 |
| IE | S20100333 | A2 | 5/2011 |
| IN | 2008KN01699 | A | 12/2008 |
| IN | 2008KN04233 | A | 3/2009 |
| IN | 2010MU01489 | A | 7/2010 |
| IN | 2010KN03790 | A | 1/2011 |
| IN | 2011CN04743 | A | 9/2012 |
| IN | 263602 | B | 11/2014 |
| IN | 2013DN10366 | A | 12/2014 |
| IN | 2013DN07455 | A | 1/2015 |

(56) References Cited

FOREIGN PATENT DOCUMENTS

| | | | |
|---|---|---|---|
| IN | 201717006498 | A | 6/2017 |
| JP | 2000229697 | A | 8/2000 |
| JP | 2000234837 | A | 8/2000 |
| JP | 2001041631 | A | 2/2001 |
| JP | 5179691 | B2 | 5/2001 |
| JP | 2004238011 | A | 8/2004 |
| JP | 3600807 | B2 | 9/2004 |
| JP | 2006176179 | A | 7/2006 |
| JP | 2006298411 | A | 11/2006 |
| JP | 4031354 | B2 | 10/2007 |
| JP | 2007307274 | A | 11/2007 |
| JP | 4114866 | B2 | 4/2008 |
| JP | 4147261 | B2 | 6/2008 |
| JP | 2009154917 | A | 7/2009 |
| JP | 2010023915 | A | 2/2010 |
| JP | 2010083582 | A | 4/2010 |
| JP | 5633697 | B2 | 12/2010 |
| JP | 2011121630 | A | 6/2011 |
| JP | 5072039 | B2 | 8/2012 |
| JP | 5246797 | B2 | 4/2013 |
| JP | 2013216377 | A | 10/2013 |
| JP | 5425075 | B2 | 12/2013 |
| JP | 5566398 | B2 | 6/2014 |
| JP | 2015217965 | A | 12/2015 |
| JP | 5911187 | B1 | 4/2016 |
| JP | 5937195 | B2 | 5/2016 |
| JP | 5952805 | B2 | 6/2016 |
| JP | 6008543 | B2 | 9/2016 |
| JP | 6068289 | B2 | 1/2017 |
| JP | 2017512964 | A | 5/2017 |
| JP | 2017154795 | A | 9/2017 |
| JP | 2018104027 | A | 7/2018 |
| KR | 100808075 | B1 | 2/2008 |
| KR | 200446958 | Y1 | 12/2009 |
| KR | 101334008 | B1 | 11/2013 |
| KR | 20140045913 | A | 4/2014 |
| KR | 101551473 | B1 | 9/2015 |
| KR | 20150117724 | A | 10/2015 |
| KR | 101727758 | B1 | 4/2017 |
| KR | 101909309 | B1 | 10/2018 |
| MX | PA03011618 | A | 6/2005 |
| MX | 2017002183 | A | 5/2017 |
| NL | 1015359 | C2 | 12/2001 |
| NL | 1031411 | C2 | 9/2007 |
| NL | 2001882 | C2 | 2/2010 |
| NL | 2013377 | B1 | 9/2016 |
| NZ | 540507 | A | 10/2007 |
| NZ | 540478 | A | 11/2007 |
| NZ | 567604 | A | 1/2010 |
| PL | 189001 | B1 | 5/2005 |
| PL | 200105 | B1 | 12/2008 |
| RS | 50174 | B | 5/2009 |
| RS | 50186 | B | 5/2009 |
| TW | 200936487 | A | 9/2009 |
| TW | 201434731 | A | 9/2014 |
| WO | 0192144 | A2 | 12/2001 |
| WO | 2013119971 | A1 | 8/2013 |
| WO | 2016032333 | A1 | 3/2016 |
| WO | 2017173495 | A1 | 10/2017 |
| WO | 2017211890 | A1 | 12/2017 |
| WO | 2018099947 | A1 | 6/2018 |
| WO | 2018100013 | A1 | 6/2018 |
| WO | 2018104810 | A1 | 6/2018 |
| WO | 2018177931 | A1 | 10/2018 |
| WO | 2018212659 | A8 | 1/2019 |
| WO | 2018212660 | A8 | 1/2019 |

* cited by examiner

Fig. 2A
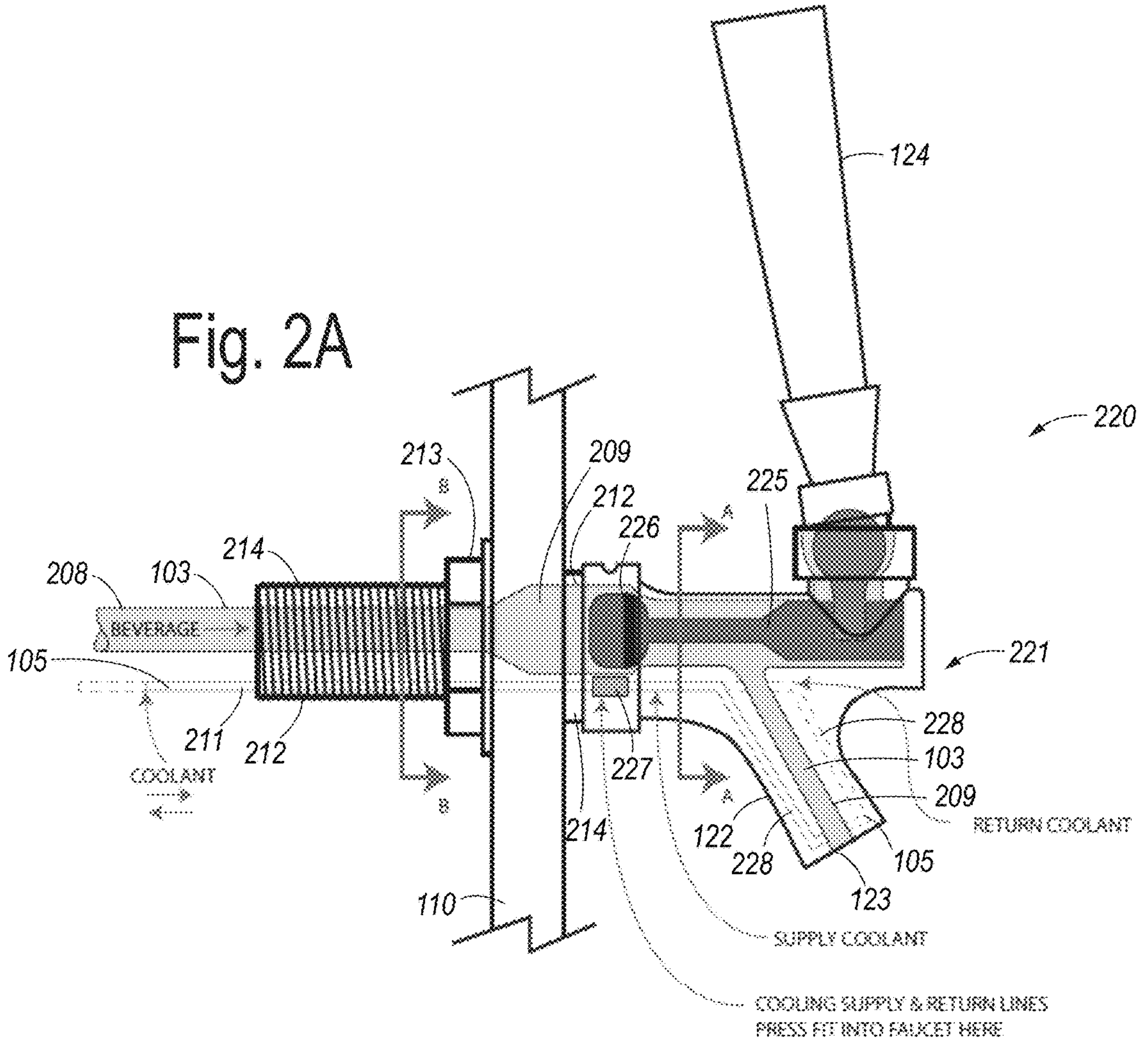
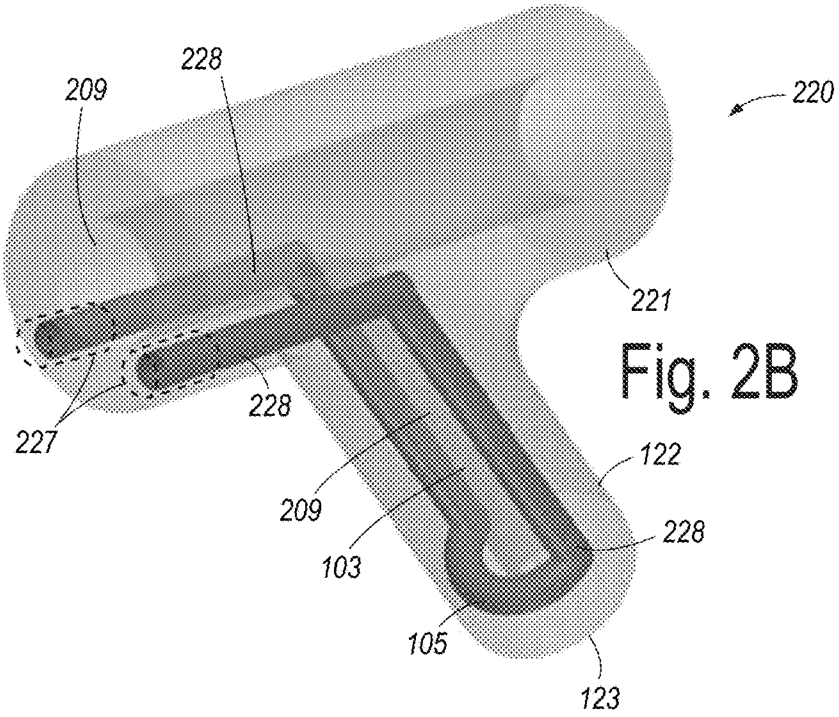
Fig. 2B

Fig. 3A
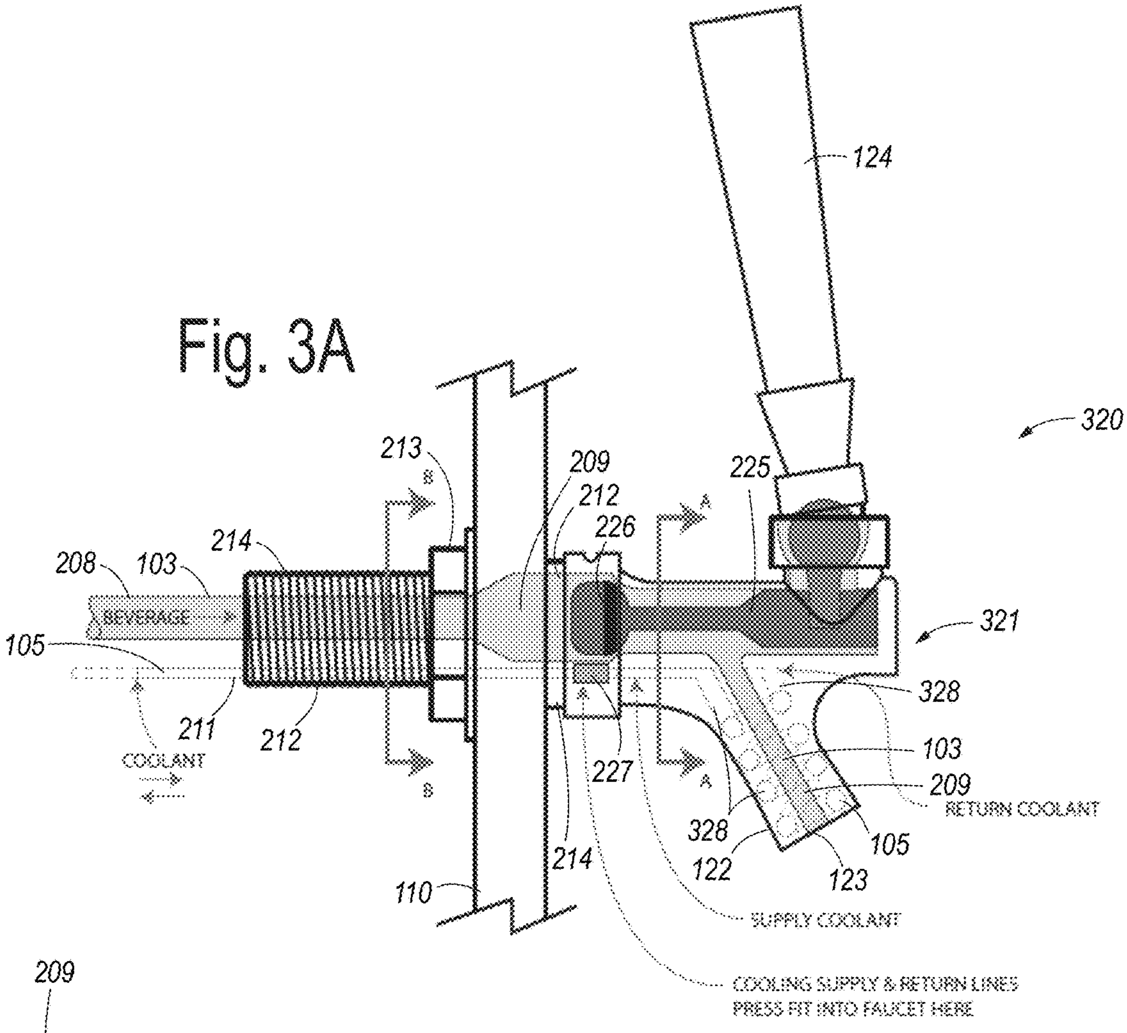
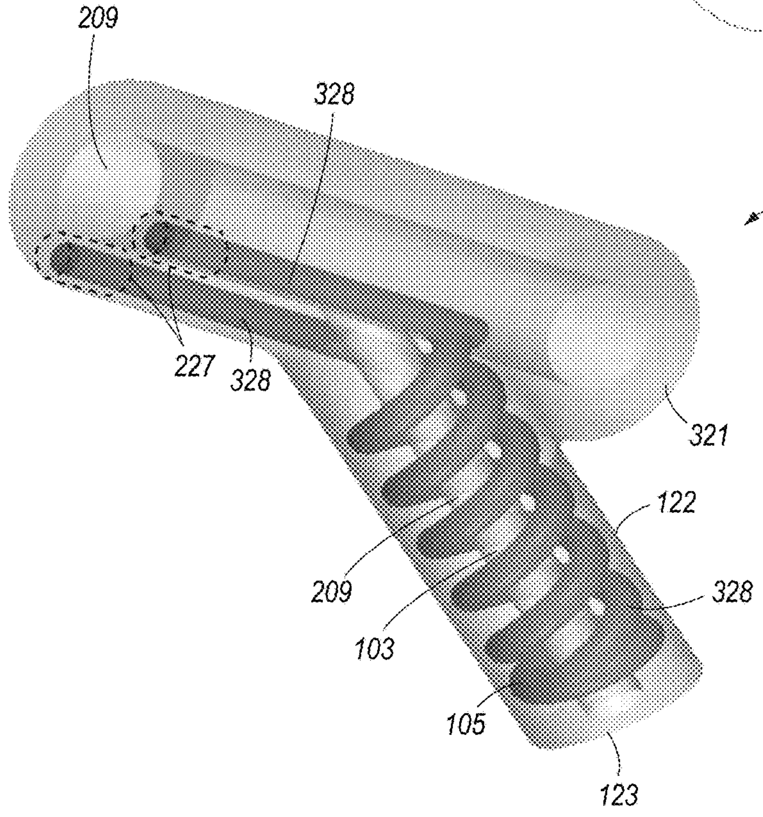
Fig. 3B

COOLED BEVERAGE DISPENSING SYSTEMS AND ASSOCIATED DEVICES

CROSS-REFERENCE TO RELATED APPLICATION(S)

The present application is a division of U.S. Non-Provisional application Ser. No. 16/276,465 filed Feb. 14, 2019, which claims priority to U.S. Provisional Application No. 62/630,791 filed Feb. 14, 2018, the entire disclosure of each of these applications is incorporated herein by reference.

TECHNICAL FIELD

The present technology is related to cooled beverage dispensing systems. In particular, various implementations of the present technology are related to beverage dispensing systems having a faucet with cooling lines configured to cool a beverage.

BACKGROUND

A beverage tower (e.g., a beer tower) is a beverage dispensing device and/or system usually found in retail establishments, such as bars, pubs, and restaurants. The beverage tower typically comprises a tower body (e.g., a column, a tank, a rail, a housing, etc.) and at least one faucet (e.g., a tap, a valve, a spigot, etc.). Beverage towers include one or more shanks connecting the faucet to the tower body. A beverage is brought from a beverage container (e.g., a keg, a cask, a barrel, etc.) to the faucet via a beverage line and/or beverage channel. When a valve in the faucet is opened (e.g., using a handle), gas pressure forces the beverage out of the beverage container, through the beverage line, and out a tip of the faucet. Because of long distances between the beverage container and the beverage tower, several beverage towers use a cooling medium (e.g., ice, chilled water, chilled glycol, cold air, etc.) to cool the beverage within the beverage line on its way to the beverage tower. These and other beverage towers use a cooling medium to cool the beverage within the beverage tower along a portion of the beverage line.

BRIEF DESCRIPTION OF THE DRAWINGS

FIG. 2A is a partially schematic side view of a beverage faucet mounted to a beverage tower body.

FIG. 2B is a partially schematic isometric view of a body portion of the faucet illustrated in FIG. 2A.

FIG. 3A is a partially schematic side view of a beverage faucet mounted to a beverage tower body.

FIG. 3B is a partially schematic perspective view of a body portion of the beverage faucet illustrated in FIG. 3A.

DETAILED DESCRIPTION

Figure 1:
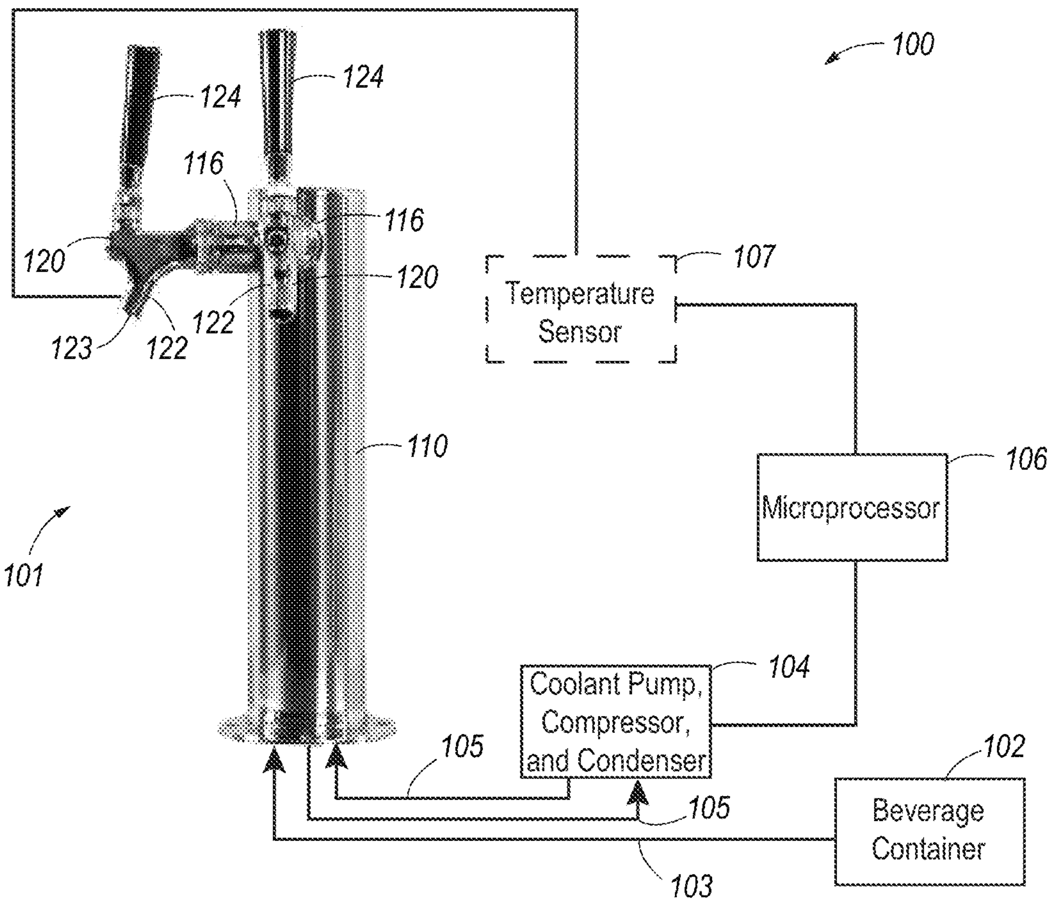
FIG. 1 is a partially schematic perspective view illustrating a beverage dispensing system.

The following disclosure describes cooled beverage dispensing systems and associated devices for cooling a beverage within a beverage faucet. As described in greater detail below, the cooled beverage dispensing systems include one or more cooling lines that extend beyond a shank and into a faucet of the beverage dispensing systems. The cooling lines can be threaded through a tower body and a shank connecting the faucet to the tower body. Alternatively, the cooling lines can be introduced into the faucet external to the shank and the tower body, for example, through a removable nozzle of the faucet. In any implementation, a cooling medium within the coolant lines cools a beverage fluid within the faucet before the beverage fluid is dispensed from the cooled beverage dispensing systems. In some implementations, the coolant lines are also configured to cool a beverage tower body, the shank, and/or the faucet to form condensation and/or frost on the tower body, the shank, and/or the faucet.

Conventional beverage dispensing systems employ coolant lines between a beverage container storing a beverage fluid and a beverage tower used for dispensing the beverage. The coolant lines run along the beverage line and into the interior of a tower body of the beverage tower where the coolant lines either terminate or are routed back toward a coolant pump. The coolant lines are configured to transport a cooling medium to cool beverage fluid in the beverage line. More specifically, the two primary purposes of coolant medium in these conventional systems are (1) to prevent the beverage fluid in the beverage line from warming on its way between a beverage container storing the beverage fluid and the tower body and/or (2) to further cool the beverage fluid to a temperature below which it is stored in the beverage container.

In contrast with conventional systems and techniques, cooled beverage dispensing systems described below are configured to extend and/or introduce coolant lines into a shank and/or a faucet of a beverage tower of the cooled dispensing system. Thus, systems of the present technology are expected (i) to provide cooling to beverage fluid trapped in the shank and/or in the faucet of the beverage tower and (ii) achieve a greater cooling capability than conventional systems along the entire length of the beverage line within the beverage tower to a tip of the faucet. In some implementations, the cooled beverage dispensing systems are configured to actively monitor the temperature of the shank, the faucet, and/or the beverage fluid within the shank and/or the faucet. Based at least in part on these temperature measurements, these systems can adjust characteristics (e.g., flow rate and/or temperature) of cooling medium provided to the shank and/or to the faucet to maintain and/or adjust the temperature of the shank, the faucet, and/or the beverage fluid within the shank and/or the faucet. As such, these systems can maintain the shank, the faucet, and/or the beverage fluid within the shank and/or the faucet at an acceptable and desired temperature. Accordingly, the cooled beverage dispensing systems described below are further expected to (i) serve beverage fluid at desired and/or optimal temperatures and (ii) meet industry standards regarding dispensing of specific beverages (e.g., the NSF 20 standard—maintaining milk at 41 degrees Fahrenheit or below in an 80 degree Fahrenheit environment for a minimum of four hours at any point along the beverage dispensing system).

Specific details of several implementations of the present technology are described herein with reference to FIGS. 1-7B. In the following description, like numbers refer to similar elements within various implementations of the present disclosure. Although many of the implementations are described with respect to systems and devices for cooling and dispensing beer, other applications and other implementations in addition to those described herein are within the scope of the present technology. For example, at least some implementations of the present technology may be useful for cooling and dispensing other beverages, including wine, tea, coffee, milk, juice, kombucha, water, etc., and other implementations in addition to those disclosed herein are within the scope of the present technology. Further, implementations of the present technology can have different configurations, components, and/or procedures than those shown or described herein. Moreover, a person of ordinary skill in the relevant art will understand that implementations of the present technology can have configurations, components, and/or procedures in addition to those shown or described herein and that these and other implementations can be without several of the configurations, components, and/or procedures shown or described herein without deviating from the present technology.

The terminology used herein is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section

A. SELECTED IMPLEMENTATIONS OF COOLED BEVERAGE DISPENSING SYSTEMS AND ASSOCIATED DEVICES

FIG. 1 is a partial block diagram and partial schematic perspective view of a beverage dispensing system 100. As shown, the system 100 includes a beverage tower 101, a beverage container 102, a beverage supply line 103, a coolant pump 104, a coolant line 105, and a microprocessor 106. The beverage tower 101 has a tower body 110, two beverage faucets 120 (e.g., taps, valves, spigots, etc.) with handles 124, and two shanks (not shown) connecting corresponding beverage faucets 120 to the tower body 110. The shanks are covered by flange components 116 in FIG. 1. In other implementations, the beverage tower 101 can omit the flange components 116. As illustrated, the tower body 110 is a tower column, although in other implementations, the tower body 110 can be a tank, a rail, a housing, or any other structure configured to receive and retain (e.g., secure) one or more beverage faucets 120 (e.g., with and/or without corresponding shanks). Although the tower body 110 includes two faucets 120 and two corresponding shanks, tower bodies configured in accordance with other implementations can have a greater (e.g., three or more) or lesser (e.g., one) number of faucets 120 and/or corresponding shanks.

The beverage container 102 stores a beverage fluid (e.g., beer, wine, tea, coffee, milk, juice, kombucha, water, etc.). For example, the beverage container 102 can be a keg, a cask, a barrel, a tank, or other container. The beverage supply line 103 connects the beverage container 102 to a tip 123 (e.g., a dispense point) at the end of a spout 122 or nozzle of the faucet(s) 120. When the handle 124 of the faucet 120 is actuated, a valve (not shown) in the faucet 120 opens, which permits the beverage fluid to be dispensed from the tip 123 of the faucet 120. More specifically, gas pressure (e.g., provided by a gas tank (not shown) connected to the beverage container 102) forces the beverage fluid from the beverage container 102, through the beverage supply line 103, and out the tip 123 of the faucet 120.

The beverage dispensing system 100 can cool (e.g., chill) the beverage fluid before it is dispensed from the tip 123 of the faucet 120. For example, the system 100 can include a cooling device (e.g., a refrigerator; not shown) for cooling beverage fluid in the beverage container 102. Additionally or alternatively, the coolant pump 104 of the system 100 can include a compressor and a condenser. In operation, the coolant pump 104 of the system 100 is configured to cool or chill a cooling medium (e.g., water, glycol, air, etc.) and pump the cooling medium into the beverage tower 101 via the coolant line 105. In some implementations, the pump 104 can include a fan to chill air and/or force chilled air through the coolant line 105. As described in greater detail below, the coolant line 105 can comprise one or more tube portions, one or more connectors or adapters, and/or one or more coolant grooves and/or channels.

In some implementations of the Applicant's beverage dispensing system 100, the coolant line 105 is routed (i) through an interior cavity of the tower body 110 and proximal to (e.g., within 10 mm or less of) the beverage supply line 103, (ii) through one or more of the shanks and proximal to (e.g., within 10 mm or less of) the beverage supply line 103, and/or (iii) throughout one or more of the faucets 120 and proximal to (e.g., within 5 mm or less of) the beverage supply line 103. Thus, the cooling medium can cool (e.g., chill) the beverage fluid in the beverage supply line 103 along at least the length of the beverage supply line 103 within the beverage tower 101 and before the beverage fluid is dispensed from the system 100. In some implementations, the cooling medium can additionally cool the tower body 110, the shank(s), and/or the faucet(s) 120 such that condensation and/or frost may form on the tower body 110, the shank, the flange component 116, and/or the faucet 220. In these and other implementations, the coolant line 105 can return to the coolant pump 104 via the shanks and/or the tower body 110. In other implementations and as described in greater detail below, the coolant line 105 can terminate at the faucet(s) 120 and/or the coolant line 105 can be externally provided to the faucet(s) 120 without routing the coolant line 105 through the tower body 110 and/or through the shank(s).

As shown in FIG. 1, the beverage dispensing system 100 can further comprise a temperature sensor 107 in (e.g., wired and/or wireless) communication with the microprocessor 106. The temperature sensor 107 can be connected to the beverage tower 101 and configured to (i) measure the temperature of the faucet 120, the shank, and/or the flange component 116 and (ii) report temperature measurements to the microprocessor 106. Additionally or alternatively, the temperature sensor 107 can be configured to measure the temperature of beverage fluid within the faucet 120 and/or within the shank. The microprocessor 106 can communicate (e.g., over a wired and/or wireless connection) with the pump 104 to adjust characteristics of the cooling medium pumped into the beverage tower 101. More specifically, the microprocessor 106, based at least in part on the temperature measurements received from the temperature sensor 107, can direct the pump 104 to maintain and/or adjust the flow rate and/or the temperature of the cooling medium pumped into the beverage tower 101. In this manner, the system 100 can prevent the faucet 120, the shank, the flange component 116, and/or beverage fluid within the faucet 120 and/or within the shank from becoming too cold (e.g., to prevent the beverage fluid from freezing) and/or from becoming too warm (e.g., to prevent the beverage fluid from spoiling).

FIG. 2A is a partially schematic side view of a beverage faucet 220 (e.g., a beverage faucet 120 shown in FIG. 1) mounted to the tower body 110 and configured in accordance with an implementation of the present technology. As shown, the beverage faucet 220 is mounted to the tower body 110 via a shank 212. More specifically, a nut 213 secures the shank 212 to the tower body 110 via a threaded shank portion 214. A body portion 221 of the faucet 220 attaches to the shank 212 (e.g., is integrally formed with, is threaded to, is pushed on, etc.) such that the faucet 220 is secured to the tower body 110.

In the illustrated implementation, the beverage faucet 220 is a standard beer tap, and at least the body portion 221 of the faucet 220 is made from stainless steel. In other implementations, the beverage faucet 220 can be another type of faucet (e.g., a Perlick tap, an European tap, a stout tap, a nitro tap, an extended spout tap, a Randall, or another type of valve, spigot, tap, and/or faucet). In these and other implementations, the body portion 221 can be made from another suitable material, such as chrome-plated brass, copper, aluminum, silver, or another material, or be an assemblage of materials among the components that form the faucet 220.

FIG. 2B is a partially schematic isometric view of the body portion 221 of the faucet 220. As shown in FIGS. 2A and 2B, the body portion 221 includes a beverage channel 209 and a valve 225 (FIG. 2A) within the beverage channel 209. The beverage channel 209 is a portion of the beverage supply line 103 that extends from the tip 123 of the faucet, through the spout 122, through the interior of the valve 225, and through an interior of the threaded shank portion 214. In some implementations, the beverage channel 209 can be drilled and/or bored into the body portion 221. In other implementations, the body portion 221 can be formed using additive manufacturing (e.g., 3D-printing) or can otherwise be manufactured to include the beverage channel 209.

In the illustrated implementation, the body portion 221 of the faucet 220 aligns with the threaded shank portion 214 such that a beverage tube 208 of the beverage supply line 103 is connected to and/or is in fluid communication with the beverage channel 209. The beverage tube 208 can be a plastic (e.g., vinyl or polyethylene) hose configured to transport beverage fluid to the shank 212 and/or to the faucet 220. Thus, the beverage supply line 103 is configured to supply a beverage fluid to the tip 123 of the faucet 120 via at least the beverage tube 208 and the beverage channel 209.

The valve 225 positioned within the beverage channel 209 of the body portion 221 comprises an O-ring 226 and is operably connected to the handle 124 at an end of the valve 225 opposite the O-ring 226. When the valve 225 is in a closed position, the O-ring 226 of the valve 225 seals off the beverage channel 209 of the beverage supply line 103 such that beverage fluid is prevented from continuing beyond the O-ring 226 within the beverage supply line 103. When the handle 124 is actuated, the valve 225 is pushed towards the tower body 110, which breaks the O-ring seal and allows beverage fluid to flow past the O-ring 226, down the spout 122, and out the tip 123 of the faucet 220. While one form of valve is shown here, many other valve types can be employed.

Figure 2C:
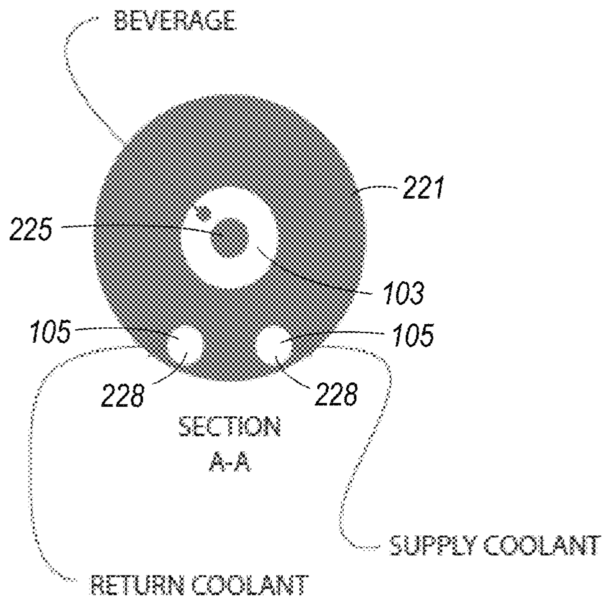
FIG. 2C is a cross sectional view of the body portion illustrated in FIGS. 2A and 2B along line A-A illustrated in FIG. 2A.

FIG. 2C is a cross sectional view of the body portion 221 of the faucet 220 taken along line A-A illustrated in FIG. 2A. As shown in FIG. 2C, the body portion 221 of the faucet 220 further comprises one or more coolant grooves or channels 228 manufactured proximal to (e.g., within 10 mm or less of) the beverage channel 209 within the body portion 221. Referring to FIGS. 2A-2C together, the coolant channels 228 trace the beverage channel 209 along left and right sides of the body portion 221 and pass underneath the beverage channel 209 proximal to (e.g., within 10 mm or less of) the tip 123 of the faucet 220. In some implementations, the coolant channels 228 can be formed, cast, drilled, and/or bored into the body portion 221. In other implementations, the body portion 221 can be formed by additive manufacturing (e.g., 3D-printing) or can otherwise be manufactured to include the coolant channels. In these and other implementations, the coolant channels 228 can receive a tube portion (not shown) of the coolant line 105. The tube portion can be made of a plastic (e.g., vinyl or polyethylene) or another material (e.g., glass, copper, silver, brass, stainless steel, aluminum, etc.).

As best shown in FIG. 2B, the coolant channels 228 are configured to pass a cooling medium proximal to (e.g., within 10 mm or less of) beverage fluid within the faucet 220 such that the beverage fluid is cooled and/or held within an acceptable temperature range within the faucet 220 before it is dispensed from the tip 123. In some implementations, cooling medium transported through the coolant channels 228 in the body portion 221 can additionally cool (e.g., chill) at least the body portion 221 of the faucet 220 such that condensation and/or frost may form on at least the body portion 221 of the faucet 220. In these and other implementations, a faucet tip insulator (not shown) can be slipped over the tip 123 of the faucet 220. The faucet tip insulator can be made of a plastic, a ceramic, or another insulative material such that the faucet tip insulator insulates the tip 123 of the faucet 220 from ambient air (e.g., to help improve thermal efficiency) and/or such that condensation or frost is prevented from forming on the tip 123 of the faucet 220. The faucet tip insulator can be releasably secured to the tip 123 using any known means, such as a threaded connection, a snap fit configuration, etc.

In these and still other implementations, a drip diverter (not shown) can be attached to the tip 123 of the faucet 220. The drip diverter can be injection molded or stamped and can be a standalone mechanical device or cast into the body portion 221 (e.g., into the spout 122) of the faucet 220. In operation, the drip diverter can collect condensation that forms on the faucet 220 and divert it away from the tip 123 of the faucet 220 (e.g., from a customer's glass as it is being filled).

Figure 2D:
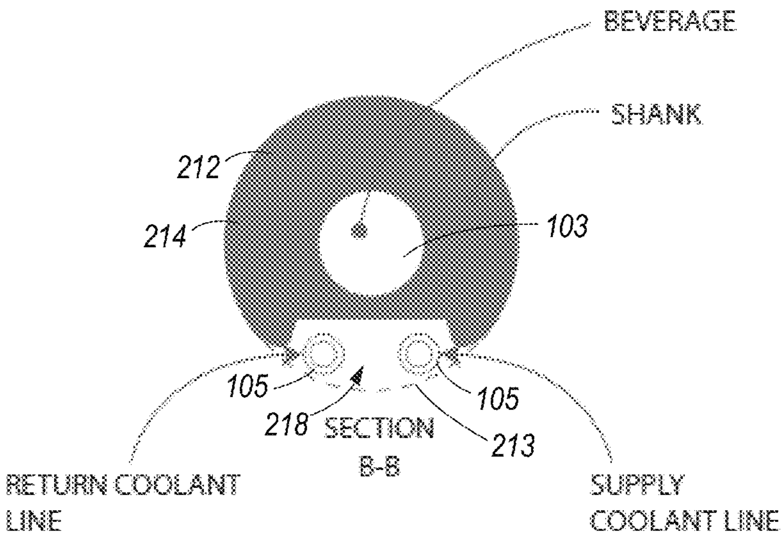
FIG. 2D is a cross sectional view of a shank illustrated in FIG. 2A.

FIG. 2D is a cross sectional view of the shank 212 taken along line B-B illustrated in FIG. 2A. As shown in FIGS. 2A and 2D, portions 211 of the coolant line 105 can extend to the faucet 220 from within the tower body 110. More specifically, the threaded shank portion 214 can include a recess 218 (FIG. 2D) such that the portions 211 of the coolant line 105 can pass through the shank 212 between the nut 213 and the threaded shank portion 214. In these implementations, the portions 211 can be plastic (e.g., vinyl or polyethylene) tubes that are threaded through the shank 212.

Referring again to FIGS. 2A and 2B, the portions 211 of the coolant line 105 are configured to connect with the coolant channels 228. In particular, one or more press fit adapters 227 may be used to connect ends of the portions 211 to the coolant channels 228 before and/or after the faucet 220 is secured to the tower body 110 via the threaded shank portion 214. In some implementations, the press fit adapter(s) 227 are sized such that the press fit adapter(s) 227 are placed over an end of the portion 211 and/or a protrusion (not shown) of the coolant channels 228. In other implementations, the press fit adapter(s) 227 are sized such that the pressed fit adapter(s) 227 extend into the end of the portion 211 and/or into the coolant channels 228.

FIG. 3A is a partially schematic side view of a beverage faucet 320 that is similar to the beverage faucets 120 and/or 220 shown in FIGS. 1 and/or 2A. Notably, the coolant line 105 illustrated in FIG. 3A, however, includes coolant grooves or channels 328 that are routed differently within the body portion 321 of the faucet 320 than the coolant channels 228 (FIGS. 2A and 2B) are routed within the body portion 221 of the faucet 220. More specifically, the body portion 321 is manufactured with coolant channels 328 that coil about the beverage channel 209 within the spout 122 of the faucet 320 in a helical or spiral fashion (shown more clearly in the partially schematic perspective view of the body portion 321 of the faucet 320 of FIG. 3B).

Figure 4:
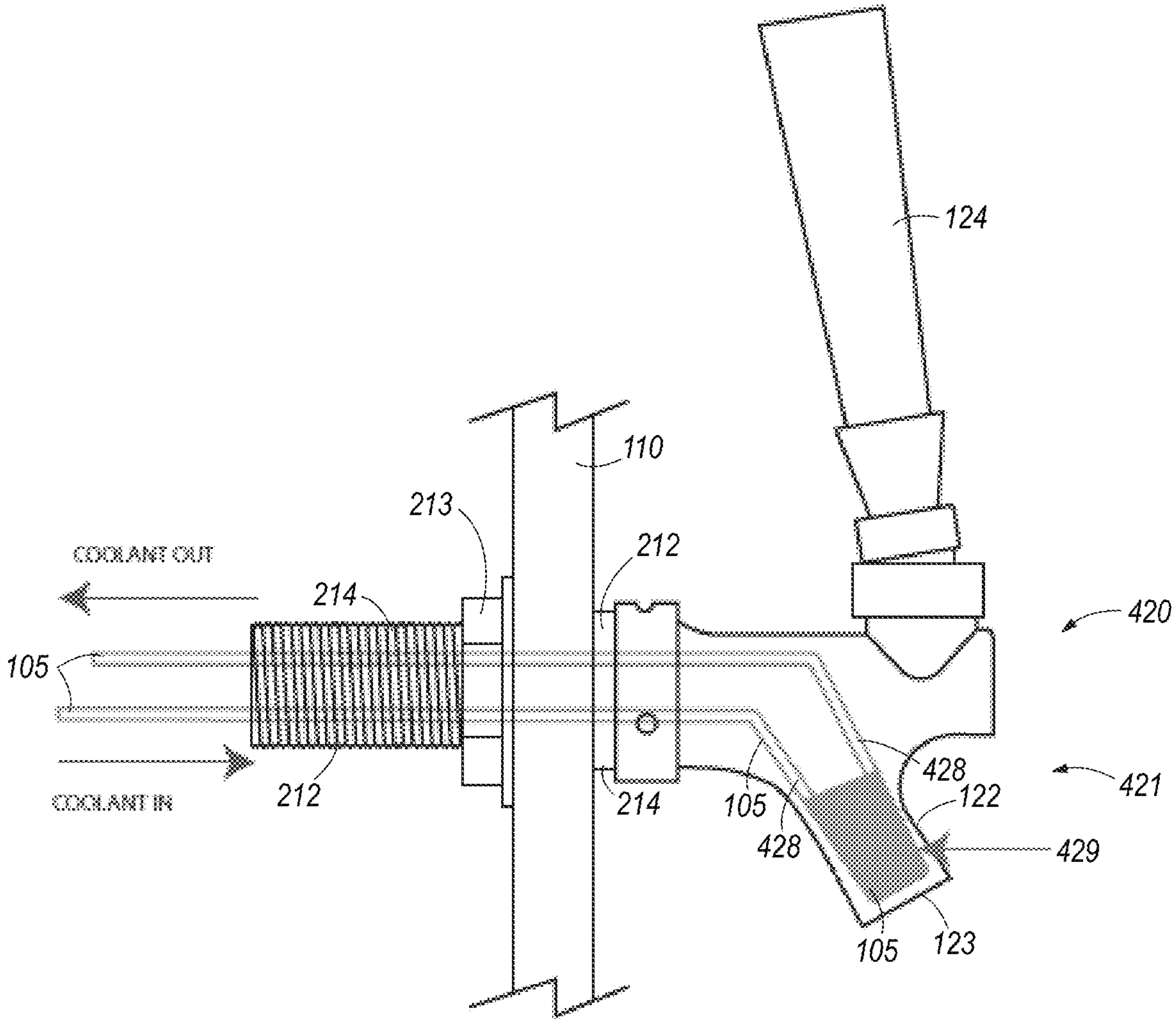
FIG. 4 is a partially schematic side view of a beverage faucet mounted to a beverage tower body.

FIG. 4 is a partially schematic side view of a beverage faucet 420 that is similar to faucets 120, 220, and/or 320 shown in FIGS. 1, 2A, and/or 3A. In the illustrated implementation, the beverage supply line 103 and the beverage channel 209 are not shown to avoid unnecessarily obscuring the description of the illustrated implementation. As shown, the body portion 421 of the beverage faucet 420 includes (i) one or more coolant grooves or channels 428 and (ii) one or more widened coolant grooves or channels 429. The coolant channel(s) 428 and the widened coolant channel(s) 429 are manufactured proximal to (e.g., within 10 mm or less of) the beverage channel 209 within the body portion 421 of the faucet 420. The coolant channel(s) 428 trace the beverage channel 209 along at least a portion of the body portion 421 of the faucet 420 until the coolant channel(s) 428 connect with the widened coolant channel(s) 429. The widened coolant channel(s) 429 is/are configured to hold a greater amount (e.g., 1.5 times, 2 time, 3 times, or more) of cooling medium than the coolant channel(s) 428 and is/are configured to surround a large percentage (e.g., 20 percent, 30 percent, 40 percent, 50 percent, 60 percent, 70 percent, 80 percent, 90 percent, 95 percent, 99 percent, or more) of the beverage channel 209 within the body portion 421 (e.g., within the spout 122) and proximal to (e.g., within 5 mm or less of) the tip 123 of the faucet 420. In these and other implementations, the widened coolant channel(s) 429 is/are configured to occupy a large percentage (e.g., 20 percent, 30 percent, 40 percent, 50 percent, 60 percent, 70 percent, 80 percent, 90 percent, or more) of the volume of body portion 421 and/or of the spout 122 not occupied by the beverage channel 209.

Figure 5A:
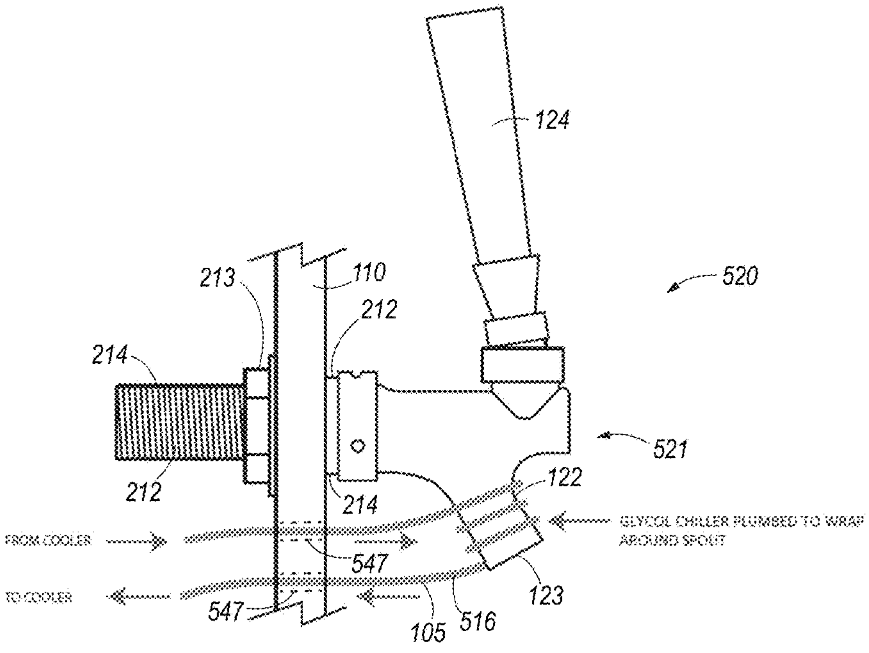
FIGS. 5A and 5B are partially schematic side views of a beverage faucet mounted to a beverage tower body.

FIG. 5A is a partially schematic side view of a beverage faucet 520 that is similar to faucets 120, 220, 320, and/or 420 shown in FIGS. 1, 2A, 3A, and/or 4. The faucet 520 includes a portion 516 of the coolant line 105 that is coiled about the exterior of the spout 122 on a body portion 521 of the faucet 520. The portion 516 of the coolant line 105 can be provided in addition to or in lieu of portions 211, coolant channels 228, coolant channels 328, coolant channels 428, and/or widened coolant channels 429 (FIGS. 2A, 2B, 3A, 3B, and/or 4) of the coolant line 105. As shown in FIG. 5A, the tower body 110 can include one or more apertures 547 that permit the portion 516 of the coolant line 105 to enter and/or exit the interior of the tower body 110. In other implementations, the portion 516 of the coolant line can be routed through the shank 212 from within the tower body 110 similar to the portion 211 of the coolant line 105. In still other implementations, the portion 516 can extend to and/or from the faucet 520 without routing the portion 516 through the tower body 110 and/or through the shank 212.

Figure 5B:
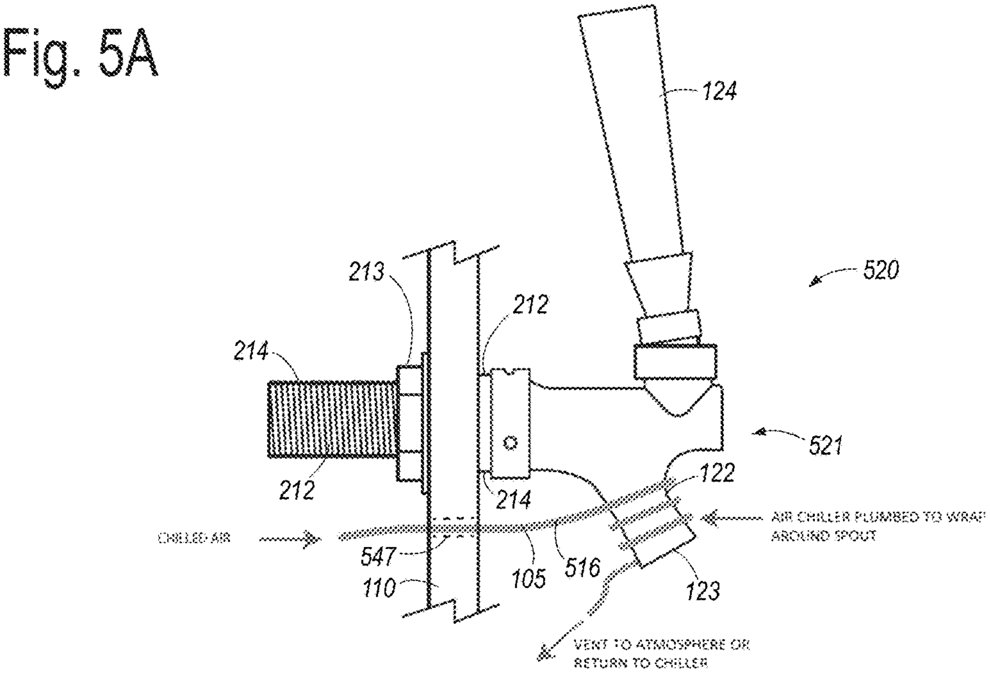

FIG. 5B is a partially schematic side view of the beverage faucet 520. In contrast with the implementation illustrated in FIG. 5A, the portion 516 of the coolant line 105 terminates in an opening at an end of the portion 516 near the faucet 520 without returning to the pump 104 (shown in FIG. 1). In this implementation, the portion 516 is configured to transport chilled air to the faucet 520 and to release the chilled air to the atmosphere out of the end of the portion 516. In other implementations, the portion 516 can enter the tower body 110 and/or the shank 212 before terminating such that the chilled air is released inside the tower body 110 and/or inside the shank 212. Alternatively, the portion 516 can return to a refrigeration unit (not shown) that is at, for example, the pump 104 shown in FIG. 1 and/or is configured to supply chilled air to the portion 516.

Figure 6:
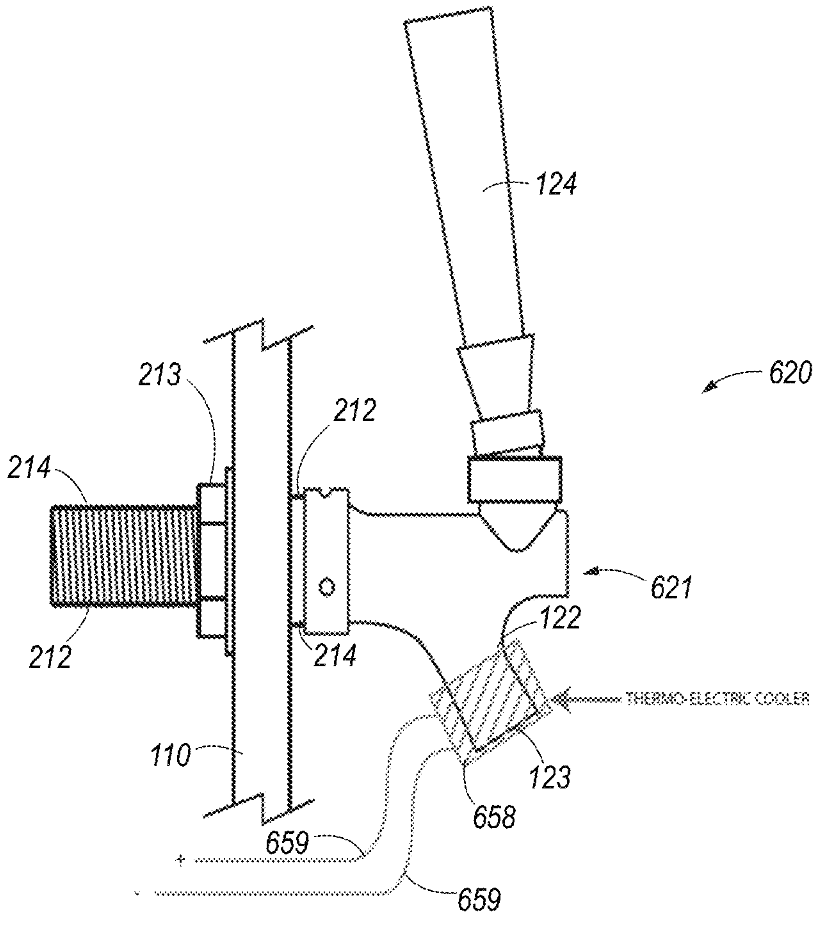
FIG. 6 is a partially schematic side view of a beverage faucet mounted to a beverage tower body.

FIG. 6 is a partially schematic side view of another alternative beverage faucet 620 that is similar to the beverage faucets 120, 220, 320, 420, and/or 520 shown in FIGS. 1, 2A, 3A, 4, 5A, and/or 5B, respectively. The faucet 620 includes a thermo-electric cooler 658 wrapped about the exterior of the spout 122 on a body portion 621 of the faucet 620. The thermo-electric cooler 658 can be provided in addition to or in lieu of portions 211, coolant channels 228, coolant channels 328, coolant channels 428, and/or widened coolant channels 429 (FIGS. 2A, 2B, 3A, 3B, and/or 4) of the coolant line 105. As shown in FIG. 6, the thermo-electric cooler 658 includes electrical leads 659 that extend to and/or from the faucet 620 without routing the electrical leads 659 through the tower body 110 and/or through the shank 212. In other implementations, the tower body can include one or more apertures that permit the electrical leads 659 to enter and/or exit the interior of the tower body 110, or the electrical leads 659 can be routed through the tower body 110 and through the shank 212 similar to the portion 211 of the coolant line 105.

Figure 7A:
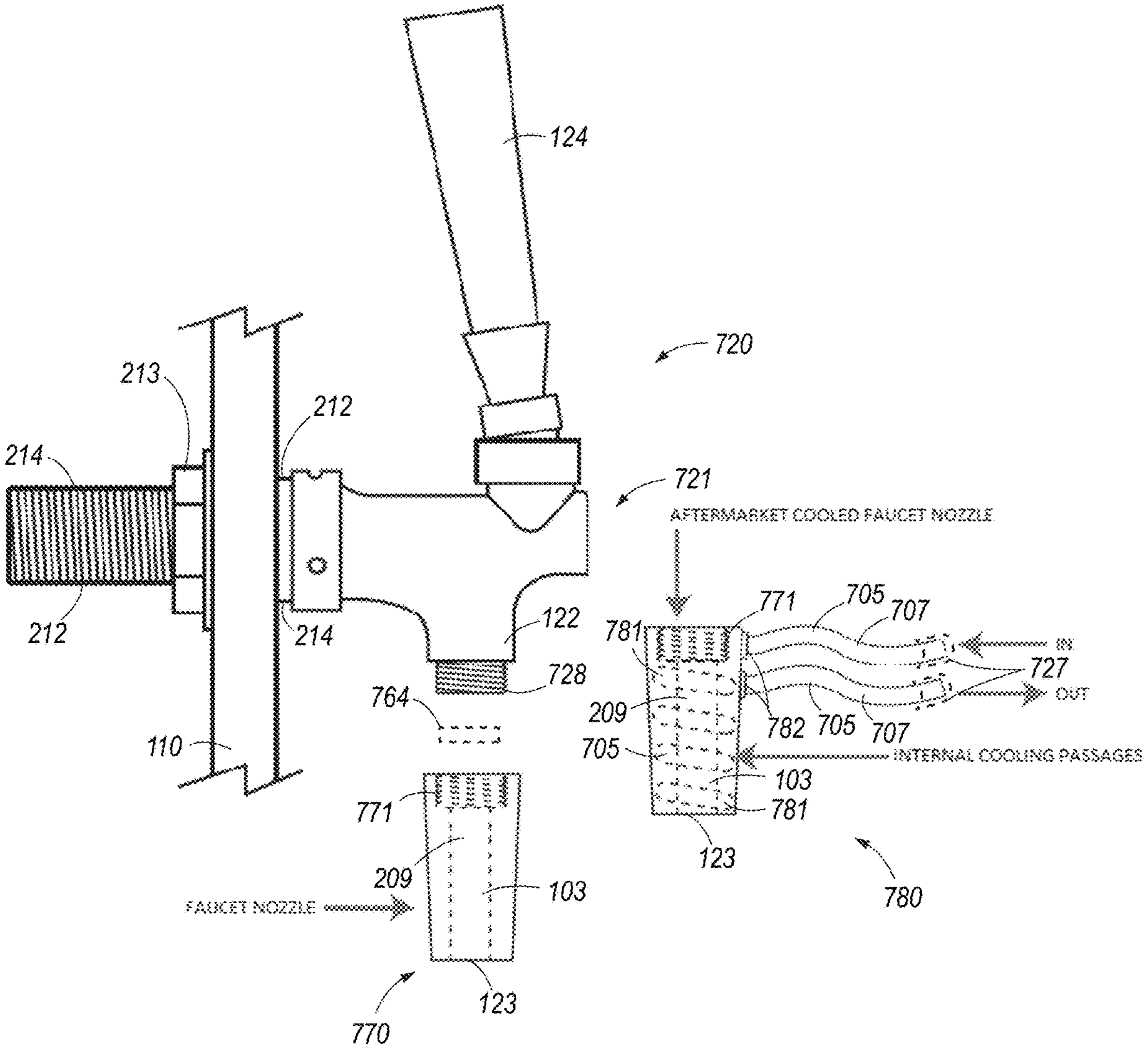
FIG. 7A is a partially schematic side view of a beverage faucet mounted to a beverage tower body, a removable nozzle, and a cooled removable nozzle.

FIG. 7A is a partially schematic side view of a beverage faucet 720 that is similar to the faucet 120 shown in FIG. 1. The faucet 720 differs from the faucets 220, 320, 420, 520, and 620 in that the faucet 720 includes a body portion 721 with a threaded protrusion 728 on the spout 122. The threaded protrusion 728 is configured to receive and retain or secure a removable nozzle 770, a cooled removable nozzle 780, and/or a cooled removable nozzle 790 (FIG. 7B) having corresponding threading 771. In other implementations, the removable nozzle 770, the cooled removable nozzle 780, and/or the cooled removable nozzle 790 can be connected to the spout 122 using other connection methods (e.g., using a John Guest connector).

In some implementations, an aerator or diffuser plate 764 can be installed within the faucet 720, within the nozzle 770, within the nozzle 780, and/or within the nozzle 790. For example, the diffuser plate 764 can be installed when dispensing specific beverage fluids (e.g., stout beers) and/or when using nitrogen to dispense beverage fluids. The diffuser plate 764 can be configured to (i) shape the stream of a dispensed beverage fluid, (ii) whip a dispensed beverage fluid (e.g., a stout beer to give it a creamy texture), and/or (iii) reduce noise created by the faucet 720, the nozzle 770, the nozzle 780, and/or the nozzle 790 when dispensing a beverage fluid.

Figure 7B:
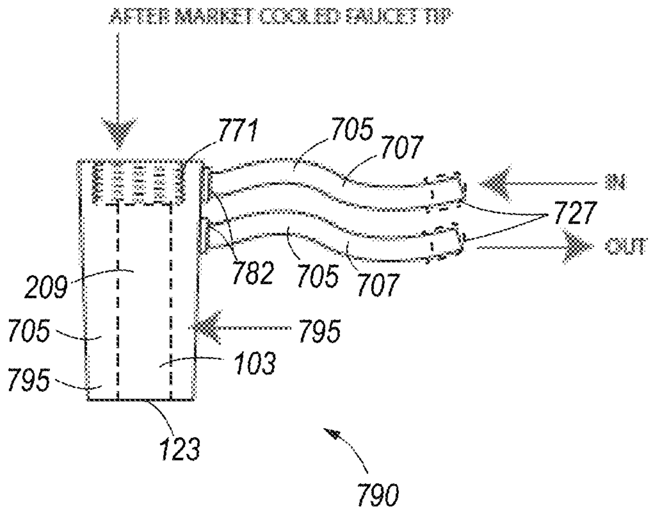
FIG. 7B is partially schematic side view of a cooled removable nozzle.

As shown in FIGS. 7A and 7B, the removable nozzle 770, the cooled removable nozzle 780, and the cooled removable nozzle 790 are configured to align with the spout 122 of the body portion 721 such that the beverage channel 209 extends to the tip 123 of the faucet 720 at the end of the removable nozzles 770, 780, and/or 790. The nozzles 770, 780, and/or 790 can be made of any suitable material, such as plastic, glass, stainless steel, brass, chrome-plated brass, aluminum, silver, copper, or another metal. The cooled removable nozzle 780 (FIG. 7A) includes one or more coolant grooves or channels 781 as a portion of a coolant line 705. The coolant channels 781 can coil about the beverage channel 209 within the nozzle 780 in a helical or spiral fashion. In contrast, the cooled removable nozzle 790 (FIG. 7B) includes one or more widened coolant grooves or channels 795. The widened coolant channel(s) 795 is/are configured to hold a greater amount (e.g., 1.5 times, 2 time, 3 times, or more) of cooling medium than the coolant channel(s) 781 and is/are configured to surround a large percentage (e.g., 20 percent, 30 percent, 40 percent, 50 percent 60 percent, 70 percent, 80 percent, 90 percent, 95 percent, 99 percent, or more) of the beverage channel 209 within the cooled removable nozzle 790. In these and other implementations, the widened coolant channel(s) 795 is/are configured to occupy a large percentage (e.g., 30 percent, 40 percent, 50 percent, 60 percent, 70 percent, 80 percent, 90 percent, or more) of the volume of the cooled removeable nozzle 790 not occupied by the beverage channel 209.

In some implementations, the coolant channel(s) 781 and/or the widened coolant channel(s) 795 can be formed, cast, drilled, and/or bored into the cooled removable nozzles 780 and/or 790, respectively. In other implementations, the removable nozzles 780 and/or 790 can be formed by additive manufacturing (e.g., 3D-printing) or can otherwise be manufactured to include the coolant channels 781 and/or the widened coolant channels 795, respectively. In these and other implementations, the coolant channels 781 and/or the widened coolant channels 795 can receive a tube portion (not shown) of the coolant line 705. The tube portion can be made of a plastic (e.g., vinyl or polyethylene) or another material (e.g., glass, copper, silver, brass, stainless steel, aluminum, etc.).

The coolant channels 781 and/or the widened coolant channels 795 are configured to pass a cooling medium proximal to (e.g., within 5 mm or less of) beverage fluid within the beverage channel 209 of the nozzles 780 and/or 790, respectively, such that the beverage fluid is cooled and/or held within an acceptable temperature range within the nozzles 780 and/or 790, respectively, before it is dispensed from the tip 123. In some implementations, cooling medium transported through the coolant channels 781 and/or through the widened coolant channels 795 of the coolant line 705 can additionally cool (e.g., chill) at least the nozzles 780 and/or 790 of the faucet 720 such that condensation and/or frost may form on at least the nozzles 780 and/or 790.

In some implementations, the cooled removable nozzles 780 and/or 790 can include adapters or connectors 782 to facilitate connecting the coolant channels 781 and/or the widened coolant channels 795 of the coolant line 705 to portions 707 of the coolant line 705 external to the cooled removable nozzles 780 and/or 790. The portions 707 of the coolant line 705 can be similar to the portions 211 of the coolant line 105 shown in FIGS. 2A and 3A and/or to the portion 516 shown in FIGS. 5A and 5B.

The coolant line 705 can be a separate coolant line from the coolant line 105 shown in FIGS. 1-5B, and/or the coolant line 705 can be routed to the coolant pump 104 (shown in FIG. 1) and/or to a separate coolant pump (not shown), condenser (not shown), and/or compressor (not shown). In some implementations, the portions 707 of the coolant line 105 can be routed through and/or within the tower body 110, through the shank 212, and/or through the body portion 721 of the faucet 720. In these and other implementations, the portions 707 of the coolant line 105 can be routed external to the tower body, the shank, and/or the faucet 720. In any implementation, the coolant line 705 can be used in addition to or in lieu of the coolant line 105.

In other implementations, the coolant line 705 can be a supplemental portion of the coolant line 105 and can be connected to the pump 104 shown in FIG. 1. In these implementations, adapters or connectors 727 (e.g., connectors 227; FIG. 2A) can be used to facilitate connecting the portions 707 to other portions of the coolant line 105. In some implementations, one or more of the portions 707 can connect to the coolant line 105 by connecting to the coolant channels 228, to the coolant channels 328, to the coolant channels 428, and/or to the widened coolant channels 429 (FIGS. 2A, 2B, 3A, 3B, and/or 4) in the faucet 720. In other implementations, one or more of the portions 707 can connect to the portion 211 (FIGS. 2A and/or 3A) in the shank 212 and/or in the tower body 110. In still other implementations, one or more of the portions 707 can connect to the portion 516 (FIGS. 5A and/or 5B) and/or to another portion of the coolant line 105 in the shank 212, in the tower body 110, and/or external to the shank 212, the tower body 110, and/or the faucet 720. Although the selected implementations of cooled beverage dispensing systems and associated devices are shown above with faucets having only one tip, faucets in other implementations can include more than one tip such that the faucets have more than one dispense point (e.g., to dispense one or more beverage fluids). In some implementations, a multi-tipped faucet can include more than one beverage channel (e.g., one beverage channel per tip). In these and other implementations, a multi-tipped faucet can include one or more coolant lines. For example, a faucet can include a coolant line (e.g., one or more coolant grooves) per tip and/or beverage channel. As another example, a faucet can include a single coolant line that includes multiple branches (e.g., multiple coolant grooves) corresponding to a respective tip and/or beverage line. As yet another example, tips and/or beverage lines can share coolant lines and/or coolant grooves. That is, a coolant line and/or coolant groove can be configured to cool beverage fluids in more than one beverage channel and/or proximal (e.g., within 5 mm or less of) more than one tip. In any implementation, the coolant line(s) and/or coolant groove(s) in a multi-tipped faucet can be configured to trace and/or spiral about one or more beverage channels within the faucet in accordance with the implementations discussed above. In these implementations, the coolant line(s) and/or coolant groove(s) can (i) be positioned between adjacent tips and/or beverage channels and/or (ii) spiral about (e.g., every single, every other, every two, etc.) beverage channel(s).

B. CONCLUSION

The above detailed descriptions of implementations of the technology are not intended to be exhaustive or to limit the technology to the precise form disclosed above. Although specific implementations of, and examples for, the technology are described above for illustrative purposes, various equivalent modifications are possible within the scope of the technology, as those skilled in the relevant art will recognize. For example, the faucets 120, 220, 320, 420, 520, and/or 620 shown in FIGS. 1-6, respectively, can include the diffuser plate 764 shown in FIG. 7A. Furthermore, the various implementations described herein may also be combined to provide further implementations.

From the foregoing, it will be appreciated that specific implementations of the technology have been described herein for purposes of illustration, but well-known structures and functions have not been shown or described in detail to avoid unnecessarily obscuring the description of the implementations of the technology. To the extent any material incorporated herein by reference conflicts with the present disclosure, the present disclosure controls. Where the context permits, singular or plural terms may also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms may also include the plural or singular term, respectively. Furthermore, as used herein, the phrase "and/or" as in "A and/or B" refers to A alone, B alone, and both A and B. Additionally, the terms "comprising," "including," "having" and "with" are used throughout to mean including at least the recited feature(s) such that any greater number of the same feature and/or additional types of other features are not precluded.

The teachings of the system provided herein can be applied to other systems, not necessarily the system described above. The elements and acts of the various examples described above can be combined to provide further implementations of the present system. Some alternative implementations of the present system may include not only additional elements to those implementations noted above, but also may include fewer elements.

From the foregoing, it will also be appreciated that various modifications may be made without deviating from the technology. For example, one of ordinary skill in the art will understand that various components of the technology can be further divided into subcomponents, or that various components and functions of the technology may be combined and/or integrated. Furthermore, although advantages associated with certain implementations of the technology have been described in the context of those implementations, other implementations may also exhibit such advantages, and not all implementations need necessarily exhibit such advantages to fall within the scope of the technology.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

We claim:

1. A beverage dispensing tap, comprising:
a body portion, including—
a beverage channel;
a valve positioned in the beverage channel;
a spout having a tip and comprising at least a portion of the beverage channel, and
one or more coolant channels configured to receive a coolant therethrough or to receive at least one coolant carrying line disposed therethrough,
wherein the one or more coolant channels permit the coolant to pass proximate at least the portion of the beverage channel and within 10 mm or less of the tip of the spout; and
a handle connection connected to the valve, wherein the handle connection is configured to receive a handle.

2. The beverage dispensing tap of claim 1, wherein the one or more coolant channels trace at least the portion of the beverage channel within the spout.

3. The beverage dispensing tap of claim 1, wherein the beverage dispensing tap further comprises a second coolant carrying line routed about an exterior portion of the spout.

4. The beverage dispensing tap of claim 3, wherein the at least one coolant carrying line, the second coolant carrying line, or both the at least one coolant carrying line and the second coolant carrying line, terminate at the spout.

5. The beverage dispensing tap of claim 1, further comprising a thermo-electric cooler wrapped about an exterior portion of the spout.

6. The beverage dispensing tap of claim 1, wherein the one or more coolant channels circle or spiral about at least the portion of the beverage channel within the spout.

7. The beverage dispensing tap of claim 1, wherein the handle connection is a threaded connection to receive an elongated and upwardly extending tap handle.

8. The beverage dispensing tap of claim 1, wherein the one or more coolant channels permit the coolant to pass within 5 mm or less of the tip of the spout.

9. A removable nozzle for use with a beverage dispensing tap, the removable nozzle comprising:
a body;
an inlet at a first end of the body;
a tip at a second end of the body opposite the first end;
an outlet at the tip;
a beverage channel extending between the inlet and the outlet within the body; and
one or more coolant grooves,
wherein the one or more coolant grooves are configured to permit a cooling medium to pass proximate a portion of the beverage channel and within 10 mm or less of the tip such that a beverage fluid in the beverage channel is cooled via the cooling medium in the one or more coolant grooves.

10. The removable nozzle of claim 9, further comprising threading at the first end of the body corresponding to threading at the beverage dispensing tap.

11. The removable nozzle of claim 9, further comprising a diffuser plate.

12. The removable nozzle of claim 9, wherein the one or more coolant grooves coil about the portion of the beverage channel within the body.

13. The removable nozzle of claim 9, wherein the one or more coolant grooves include a coolant chamber configured to surround the portion of the beverage channel within the body.

14. The removable nozzle of claim 13, wherein the coolant chamber is configured to occupy thirty percent or more of a volume of the removable nozzle not occupied by the beverage channel.

15. The removable nozzle of claim 9, further comprising one or more adapters configured to connect the one or more coolant grooves to a portion of a coolant line external to the removable nozzle.

16. The removable nozzle of claim 9, wherein the one or more coolant grooves are configured to permit the cooling medium to pass within 5 mm or less of the tip.

* * * * *